US010662502B2

(12) United States Patent
Robertson et al.

(10) Patent No.: US 10,662,502 B2
(45) Date of Patent: May 26, 2020

(54) SYSTEMS AND METHODS FOR IMPROVED METAL RECOVERY USING AMMONIA LEACHING

(71) Applicant: FREEPORT MINERALS CORPORATION, Phoenix, AZ (US)

(72) Inventors: Joanna M Robertson, Thatcher, AZ (US); Thomas R Bolles, Tucson, AZ (US); Dennis D Gertenbach, Lakewood, CO (US)

(73) Assignee: FREEPORT MINERALS CORPORATION, Phoenix, AZ (US)

( * ) Notice: Subject to any disclaimer, the term of this patent is extended or adjusted under 35 U.S.C. 154(b) by 43 days.

(21) Appl. No.: 16/011,037

(22) Filed: Jun. 18, 2018

(65) Prior Publication Data
US 2018/0298505 A1    Oct. 18, 2018

Related U.S. Application Data

(63) Continuation of application No. 14/940,548, filed on Nov. 13, 2015, now Pat. No. 10,006,133, which is a
(Continued)

(51) Int. Cl.
*C22B 15/00* (2006.01)
*C22B 3/00* (2006.01)
(Continued)

(52) U.S. Cl.
CPC ............ *C22B 15/0008* (2013.01); *C22B 3/14* (2013.01); *C22B 3/44* (2013.01); *C22B 15/0078* (2013.01);
(Continued)

(58) Field of Classification Search
CPC ......... C22B 3/14; C22B 3/44; C22B 15/0008; C22B 15/0078; C22B 15/0089; C22B 15/0093; C22B 23/0446; C22B 23/0461
See application file for complete search history.

(56) References Cited

U.S. PATENT DOCUMENTS 3,194,653 A    7/1965  Keyes
3,761,249 A    9/1973  Lucas et al.
(Continued)

FOREIGN PATENT DOCUMENTS

CA    1040868    * 10/1978
CN    1121532      5/1996
(Continued)

OTHER PUBLICATIONS

International Search Report and Written Opinion issued from corresponding International Application No. PCT/US2014/020508, dated Jun. 10, 2014.
(Continued)

*Primary Examiner* — Tima M. McGuthry-Banks
(74) *Attorney, Agent, or Firm* — Snell & Wilmer L.L.P.

(57) ABSTRACT

Systems and methods for basic leaching are provided. In various embodiments, a method is provided comprising leaching a slurry comprising a copper bearing material and an ammonia leach medium, adding copper powder to the slurry, separating the slurry into a pregnant leach solution and solids, and performing a solvent extraction on the pregnant leach solution to produce an loaded aqueous stream.

14 Claims, 8 Drawing Sheets

Related U.S. Application Data continuation of application No. 13/804,009, filed on Mar. 14, 2013, now Pat. No. 9,187,803.

(51) Int. Cl.
*C22B 3/44* (2006.01)
*C22B 3/14* (2006.01)

(52) U.S. Cl.
CPC ...... *C22B 15/0089* (2013.01); *C22B 15/0093* (2013.01); *C22B 23/0446* (2013.01); *C22B 23/0461* (2013.01); *Y02P 10/236* (2015.11)

(56) References Cited

U.S. PATENT DOCUMENTS

| | | | |
|---|---|---|---|
| 3,923,616 | A | 12/1975 | Atadan et al. |
| 3,975,507 | A | 8/1976 | Matson |
| 3,981,968 | A * | 9/1976 | Miller ............... C22B 3/0017 423/139 |
| 3,985,553 | A | 10/1976 | Kunda et al. |
| 4,030,917 | A | 6/1977 | Fonseca |
| 4,036,639 | A | 7/1977 | Yurko |
| 4,083,915 | A | 4/1978 | Hubred et al. |
| 4,085,188 | A * | 4/1978 | Subramanian ......... C01G 45/00 423/150.4 |
| 4,249,905 | A | 2/1981 | Caswell |
| 5,176,802 | A | 1/1993 | Duyvesteyn et al. |
| 5,622,615 | A | 4/1997 | Young et al. |
| 5,895,633 | A | 4/1999 | King |
| 9,175,366 | B2 | 11/2015 | Robertson et al. |
| 9,187,803 | B2 | 11/2015 | Robertson et al. |
| 2003/0019330 | A1 | 1/2003 | Marsden et al. |
| 2016/0068977 | A1 | 3/2016 | Robertson et al. |

FOREIGN PATENT DOCUMENTS

| | | |
|---|---|---|
| RU | 94015260 | 1/1996 |
| RU | 2179589 | 2/2002 |
| SU | 11156 | 9/1929 |
| SU | 579906 | 10/1977 |
| WO | WO 2006049631 | 5/2006 |
| WO | WO 2008049177 | 5/2008 |

OTHER PUBLICATIONS

International Search Report and Written Opinion issued for International Application No. PCT/US2014/020511, dated Jun. 10, 2014.
International Preliminary Report on Patentability issued from corresponding International Application No. PCT/US2014/020508 dated Sep. 24, 2015.
International Preliminary Report on Patentability issued from International Application No. PCT/US2014/020511, dated Sep. 24, 2015.
Restriction Requirement from U.S. Appl. No. 13/804,009 dated Dec. 2, 2014.
Non-Final Office Action from U.S. Appl. No. 13/804,009, dated Apr. 9, 2015.
Interview Summary from U.S. Appl. No. 13/804,009, dated May 14, 2015.
Notice of Allowance from U.S. Appl. No. 13/804,009, dated Jul. 14, 2015.
Non-Final Office Action from U.S. Appl. No. 13/804,053, dated Dec. 10, 2014.
Final Office Action from U.S. Appl. No. 13/804,053, dated Apr. 23, 2015.
Interview Summary from U.S. Appl. No. 13/804,053, dated May 13, 2015.
Notice of Allowance and Examiner's Amendment from U.S. Appl. No. 13/804,053, dated Jul. 1, 2015.
Non-Final Office Action from U.S. Appl. No. 14/940,548, dated Aug. 23, 2017.
Notice of Allowance from U.S. Appl. No. 14/940,548, dated Mar. 7, 2018.

* cited by examiner

SYSTEMS AND METHODS FOR IMPROVED METAL RECOVERY USING AMMONIA LEACHING

CROSS REFERENCE TO RELATED APPLICATION

This application is a continuation application of and claims priority to U.S. patent application Ser. No. 14/940,548 entitled "SYSTEMS AND METHODS FOR IMPROVED METAL RECOVERY USING AMMONIA LEACHING" which was filed on Nov. 13, 2015, now U.S. Pat. No. 10,006,133, issued Jun. 26, 2018. The '548 applications is a continuation application of and claims priority to U.S. patent application Ser. No. 13/804,009, entitled "SYSTEMS AND METHODS FOR IMPROVED METAL RECOVERY USING AMMONIA LEACHING," which was filed Mar. 14, 2013, now U.S. Pat. No. 9,187,803, issued Nov. 17, 2015. The aforementioned applications are hereby incorporated by reference herein in their entirety.

FIELD

The present disclosure relates, generally, to systems and methods for recovering metal values from metal bearing materials, and more specifically, to systems and methods for processing acid consuming ores.

BACKGROUND

Hydrometallurgical treatment of metal bearing materials, such as copper ores, concentrates, and other metal bearing materials, has been well established for many years. Typically, conventional hydrometallurgical processes for copper recovery involve leaching metal bearing materials with an acidic solution, either atmospherically or under conditions of elevated temperature and pressure. The resultant process stream—the pregnant leach solution—is recovered, and a processing step such as solvent extraction is used to form a highly concentrated and relatively pure metal value containing aqueous phase. One or more metal values may then be electrowon from this aqueous phase.

Certain ores consume a relatively high amount of acid during acidic leaching. Thus, highly acid consuming ores have conventionally been more expensive to process through acidic leaching. Highly acid consuming copper containing ores include copper carbonates, such as azurite and malachite, among other types of minerals.

Certain ores and/or flotation tailings contain a mix of oxides and sulfides of one or more metals associated with highly acid consuming gangue materials such as carbonates. These mixed materials may be problematic in acid leaching because of the highly acid consuming nature of the gangue minerals and because sulfide minerals leach more slowly and less completely than oxide minerals, causing low metal recovery and plant design complications.

Accordingly, processes that allow for metal recovery from highly acid consuming ores without the need for acid leaching would be advantageous.

SUMMARY

Accordingly, the present invention provides systems and methods for metal value recovery. In various embodiments, a method is provided comprising leaching a slurry comprising a copper bearing material and an ammonia leach medium, adding copper powder to the slurry, separating the slurry into a pregnant leach solution and solids, and performing a solvent extraction on the pregnant leach solution to produce a loaded aqueous stream.

Further, various embodiments of the present invention provide a system comprising a wet grinding apparatus configured to grind a metal bearing material, a basic leaching vessel configured to receive copper powder and the ground metal bearing material and produce a basic pregnant leach slurry, and a solvent extraction train configured to receive the liquid portion of the basic pregnant leach slurry.

Further areas of applicability will become apparent from the detailed description provided herein. It should be understood that the description and specific examples are intended for purposes of illustration only and are not intended to limit the scope of the present invention.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and claims when considered in connection with the drawing figures, wherein like numerals denote like elements and wherein:

DETAILED DESCRIPTION

Figure 1:
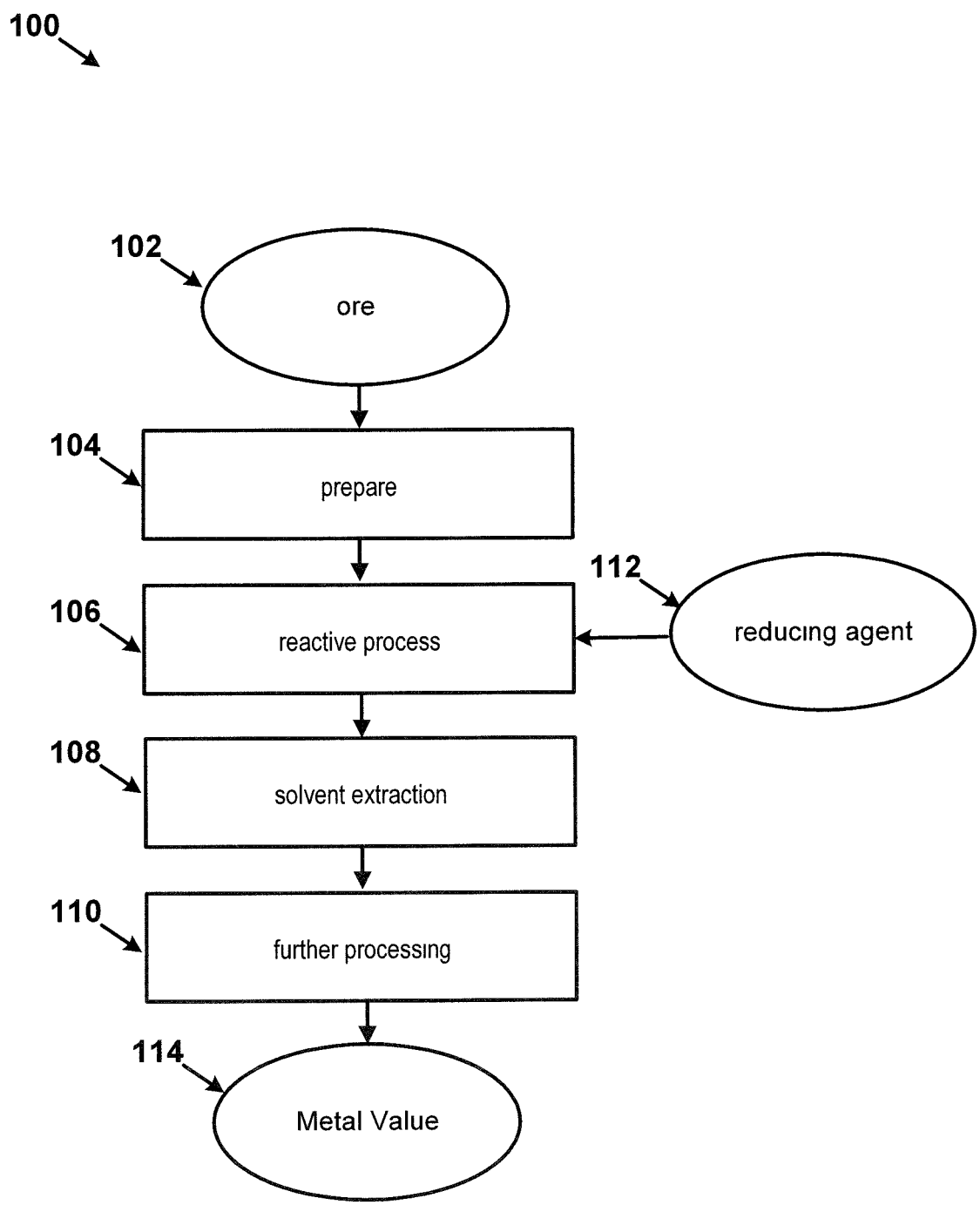
FIG. 1 is a flow diagram illustrating a process in accordance with various embodiments of the present invention.

The following description is merely exemplary in nature and is not intended to limit the present invention, its applications, or its uses. It should be understood that throughout the drawings, corresponding reference numerals indicate like or corresponding parts and features. The description of specific examples indicated in various embodiments of the present invention are intended for purposes of illustration only and are not intended to limit the scope of the invention disclosed herein. Moreover, recitation of multiple embodiments having stated features is not intended to exclude other embodiments having additional features or other embodiments incorporating different combinations of the stated features.

Furthermore, the detailed description of various embodiments herein makes reference to the accompanying drawing figures, which show various embodiments by way of illustration. While the embodiments are described in sufficient detail to enable those skilled in the art to practice the invention, it should be understood that other embodiments may be realized and that logical and mechanical changes may be made without departing from the spirit and scope of the present invention. Thus, the detailed description herein is presented for purposes of illustration only and not of limitation. For example, steps or functions recited in descriptions any method, system, or process, may be executed in any order and are not limited to the order presented. Moreover, any of the step or functions thereof may be outsourced to or performed by one or more third parties. Furthermore, any reference to singular includes plural embodiments, and any reference to more than one component may include a singular embodiment.

The present invention relates, generally, to systems and methods for recovering metal values from metal-bearing materials, and more specifically, to systems and methods for metal recovery using basic leaching. These improved systems and methods disclosed herein achieve an advancement in the art by providing a metal value recovery system that avoids the use of acid leach media in connection with high acid consuming metal bearing materials. Such technology tends to reduce the cost of metal recovery by, at least, eliminating acid costs associated with leaching a given ore body mass. Moreover, acid-free recovery of metal bearing materials often employs roasting technology. Roasting tends to consume significant energy, which may be expensive and environmentally unfriendly, particularly in areas where energy is expensive to produce and/or transport. In addition, roasters add significant capital expenditures as well as increased operating expenditures due to maintenance and repair.

In particular, it has been discovered that leaching with a medium that comprises ammonia combined with various other features may be used to leach metal values from metal bearing materials such as ore.

There are several highly acid consuming metal bearing materials, and the selection of certain parameters over others may be influenced by the metal bearing material type and the metal that is sought in recovery. In various embodiments, metal bearing materials contain a mixture of oxides, sulfides, and carbonates. In various embodiments, copper is sought to be recovered, as well as cobalt. In that regard, in various embodiments, a mixed ore comprising sulfides may be combined with a leach in basic media to yield a metal value containing material that is suitable for use in a conditioning process, such as solvent extraction (sometimes referred to as solution extraction or liquid ion exchange).

Moreover, where both copper and cobalt are sought from a metal bearing material, the oxidation state of copper and/or cobalt may need to be adjusted. For example, in certain forms, cobalt II is soluble in ammonia while cobalt III is not. Thus, during leaching, it has been found that use of various reagents tends to reduce, and thereby solubilize cobalt II, thereby allowing cobalt II to be liberated from the metal bearing material and subject to further metal recovery operations. The reduction of, for example, cobalt, during leaching enhances efficiency, as separate, pre-leaching operations need not be employed to reduce cobalt prior to leach. This results in a savings in both capital expenditure and operating expenditure. Reaction kinetics of cobalt recovery may also be improved using various reagents. In various embodiments, copper powder may be used to effect reduction of cobalt, thus improving cobalt recovery.

With reference to FIG. 1, metal recovery 100, in accordance with various embodiments, is illustrated. Metal recovery 100 allows for metal values to be recovered from a basic leach without an acid leach. Metal recovery 100 includes ore 102, which contains one or more metal values.

Ore 102 may comprise any metal bearing material, such as an ore, a combination of ores, a concentrate, a process residue, a flotation tailings product, an impure metal salt, combinations thereof, or any other material from which metal values may be recovered. Metal values such as, for example, copper, gold, silver, zinc, platinum group metals, nickel, cobalt, molybdenum, rhenium, uranium, rare earth metals, and the like may be recovered from ore 102 in accordance with various embodiments of the present invention. Various aspects and embodiments of the present invention, however, prove especially advantageous in connection with the recovery of copper from highly acid consuming ores that include copper carbonates, such as azurite and malachite, among other highly acid consuming ores. In various embodiments, ore 102 comprises at least one or more sulfides, carbonates, and oxides. Highly acid consuming ores may comprise any metal bearing material that requires a high ratio or acid to metal bearing material volume to leach a commercially significant proportion of the metal values in the metal bearing material. In various embodiments, ore 102 comprises at least copper and cobalt and/or compounds comprised of copper and/or cobalt.

Ore 102 may be prepared in preparation 104. Preparation 104 may include any form of preparation for ore 102 prior to reactive process 106. In various embodiments, preparation 104 is omitted, although various advantages may be derived through the use of preparation 104. Metal bearing materials may be prepared in a variety of ways. Ores may be dried, crushed, pulverized, finely ground, or undergo any combination thereof. Ores may be concentrated to form a metal bearing concentrate. A variety of acceptable techniques and devices for reducing the particle size of the ore 102 are currently available, such as crushers, ball mills, tower mills, ultrafine grinding mills, attrition mills, stirred mills, horizontal mills and the like, and additional techniques may later be developed that may achieve the desired result of increasing the surface area of and exposing mineral surfaces within the material to be processed. In accordance with various embodiments, ore 102 may be prepared in preparation 104 by controlled wet grinding. Wet grinding tends to reduce capital expenditure and operating expenditures when compared with dry grinding. For example, a uniform, particle size distribution may be achieved. In accordance with one aspect of the present disclosure, a particle size distribution of approximately 80% particle distribution passing size ($P_{80}$) of about 75 microns may be used, as well as a particle size distribution of approximately 98% particle distribution passing size ($P_{98}$) of about 100 to about 200 microns. In accordance with one aspect of the present disclosure, a particle size distribution of approximately 80% particle distribution passing size ($P_{80}$) of about 74 microns may be used.

However, in various embodiments, a uniform, ultra-fine particle size distribution is not necessary. For example, in various embodiments, a particle size distribution of approximately 80% particle distribution passing size ($P_{80}$) of about 100 microns may be used, and in various embodiments a particle size distribution of approximately 98% particle distribution passing size ($P_{98}$) of about 100 microns may be used. In various embodiments, preparation 104 does not include controlled grinding, but does include crushing and grinding to produce larger and/or less uniform particle sizes.

For example, preparation 104 may comprise screening ore through a grizzly or other analogous device with about 250 mm openings. Further, preparation 104 may also include a mill operation. Particles having a size of less than about 250 mm can be received by mill operation which then reduces the received particles to a particle size distribution suitable for downstream processing. For example, the mill operation may provide particles having about 80% particle distribution passing size ($P_{80}$) of 100 microns. Other particle sizes described herein may also be useful. For example, in various embodiments, ore 102 may be ground to about 80% particle distribution passing size ($P_{80}$) of between about 50 microns to about 500 microns and of between about 75 microns and 400 microns. Preparation 104 yields a prepared ore that may be subject to reactive process 106.

In accordance with various embodiments, reactive process 106 may comprise any type of reactive process that is capable of yielding one or more metal values in the prepared ore in a condition to be subjected to later metal recovery steps. For example, in various embodiments, reactive process 106 comprises a leaching operation such as a basic leaching operation. In various embodiments, reactive process 106 yields a metal value bearing slurry.

Reactive process 106 may receive reducing agent 112. Reducing agent 112 may comprise any substance capable of acting as a reducing agent. For example, reducing agent 112 may comprise sulfur dioxide and/or copper powder.

Reducing agent 112 may reduce one or more metal values during reactive process 106. For example, reducing agent 112 may reduce copper and/or cobalt during reactive process 106. While reducing agent 112 may comprise any reagent that is capable of reducing copper and/or cobalt, reducing agent 112 may be selected based upon, among other factors, cost and efficacy. As described herein, certain reducing agents may cause unexpected improvements in leaching kinetics.

The metal value bearing slurry may be processed by a solid liquid phase separation. A solid liquid phase separation may be accomplished in any suitable manner, including use of filtration systems, counter-current decantation (CCD) circuits, thickeners, and the like. In various embodiments, a solid liquid phase separation may comprise further conditioning processes such as, for example, filtration, to remove fine solid particles. A variety of factors, such as the process material balance, environmental regulations, residue composition, economic considerations, and the like, may affect the decision whether to employ a CCD circuit, one thickener or multiple thickeners, one filter or multiple filters, and/or any other suitable device or combination of devices in a solid liquid separation apparatus. The solid liquid separation may separate metal value bearing slurry into a liquid portion and a solid portion. The liquid portion may be sent to solvent extraction 108.

Solvent extraction 108 may comprise any solvent extraction process. In various embodiments, solvent extraction 108 comprises a liquid-liquid extraction. During solvent extraction 108, metal values from the liquid portion of the metal value bearing slurry may be loaded selectively into an organic phase in an extraction phase, wherein the organic phase comprises an extracting agent to aid in transporting the metal values to the organic phase. The extraction phase may produce an aqueous raffinate. The aqueous raffinate from the extraction phase may include metal values, such as copper and/or cobalt, and thus may be treated to recovery such metal values, among others.

After the extraction phase, one or more scrub or wash stages may be employed. In various embodiments, one or more scrub stages are employed. For example, carbon dioxide may be dissolved in water to form carbonic acid. Carbonic acid may be mixed with the organic phase to facilitate the removal of entrained and extracted ammonia. As a weak acid, carbonic acid may neutralize entrained and extracted ammonia.

In various embodiments, one or more wash stages are employed. The wash stage may be used to purge various impurities, such as sulfates, from the organic phase, for example, by washing with an aqueous solution.

The organic phase, whether directly from the extraction stage or after one or more scrub/wash stages, may be then subjected to a solvent stripping phase, wherein the metal values are transferred to an aqueous phase. For example, more acidic conditions may shift the equilibrium conditions to cause the metal values to migrate to the aqueous phase. Barren electrolyte from an electrowinning process may be used as a stripping medium. Metal value containing liquid from solvent extraction 108 may be referred to as a loaded aqueous stream.

The loaded aqueous stream from solvent extraction 108 may be subject to further processing 110, such as electrowinning, to yield metal value 114.

Figure 2:
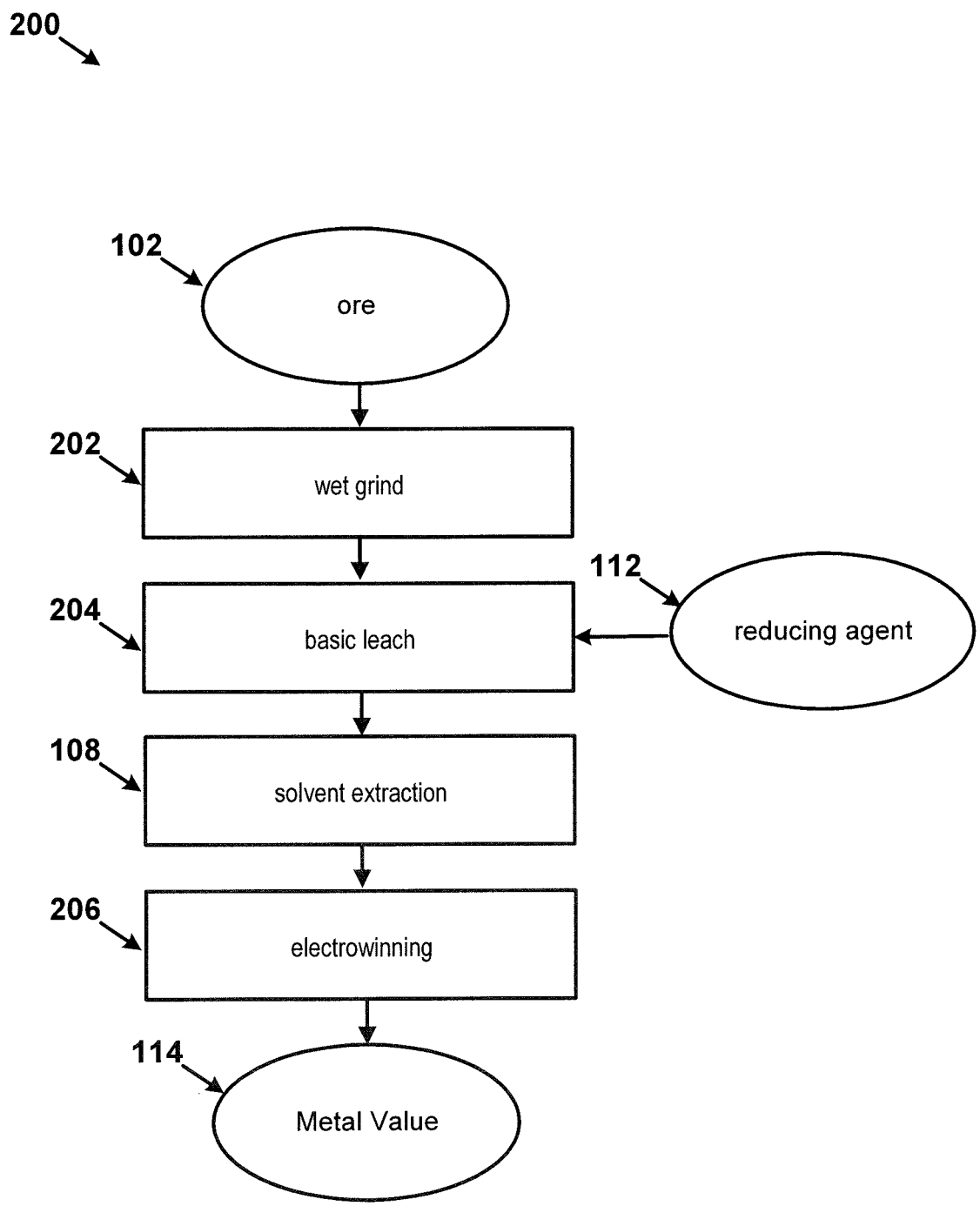
FIG. 2 is a flow diagram illustrating a process having a wet grind, in accordance with various embodiments of the present invention.

With reference to FIG. 2, metal recovery process 200 is illustrated. Metal recovery process 200 contains certain steps found in metal recovery process 100.

In accordance with various embodiments, wet grind 202 comprises a wet grind of ore 102. A wet grind may be accomplished through any grinding means described herein or otherwise. In various embodiments, wet grinding comprises sending coarse crushed ore to a semi-autogenous grinding mill followed by wet ball mill grinding in a circuit closed with a size classifier.

In accordance with various aspects, basic leach 204 receives the wet ground ore from wet grind 202 and subjects the same to leaching in basic media. Basic media may comprise any media that has a pH of greater than 7. Basic media may include an aqueous solution of ammonia, ammonium and/or ammonium containing compounds such as ammonium carbonate, ammonium sulfate, hypochlorite solutions (e.g., sodium hypochlorite and calcium, hypochlorite), peroxide solutions, percarbonate solutions, perborate solutions and combinations thereof. In various embodiments, ammonia alone or ammonia and a carbonate solution is used as basic media.

The basic media tends to liberate metal values from the wet ground ore. Basic leach 204 yields a metal value bearing slurry that may be processed by a solid liquid phase separation as described herein.

Electrowinning 206 may comprise any process that uses electrical energy to obtain a metal value. Metal value bearing solution from solvent extraction 108 may be introduced into an electowinning cell in electrowinning 206. Electrical energy may be applied to cause an ionic form of a metal value to transform into a non-ionic form.

Figure 3:
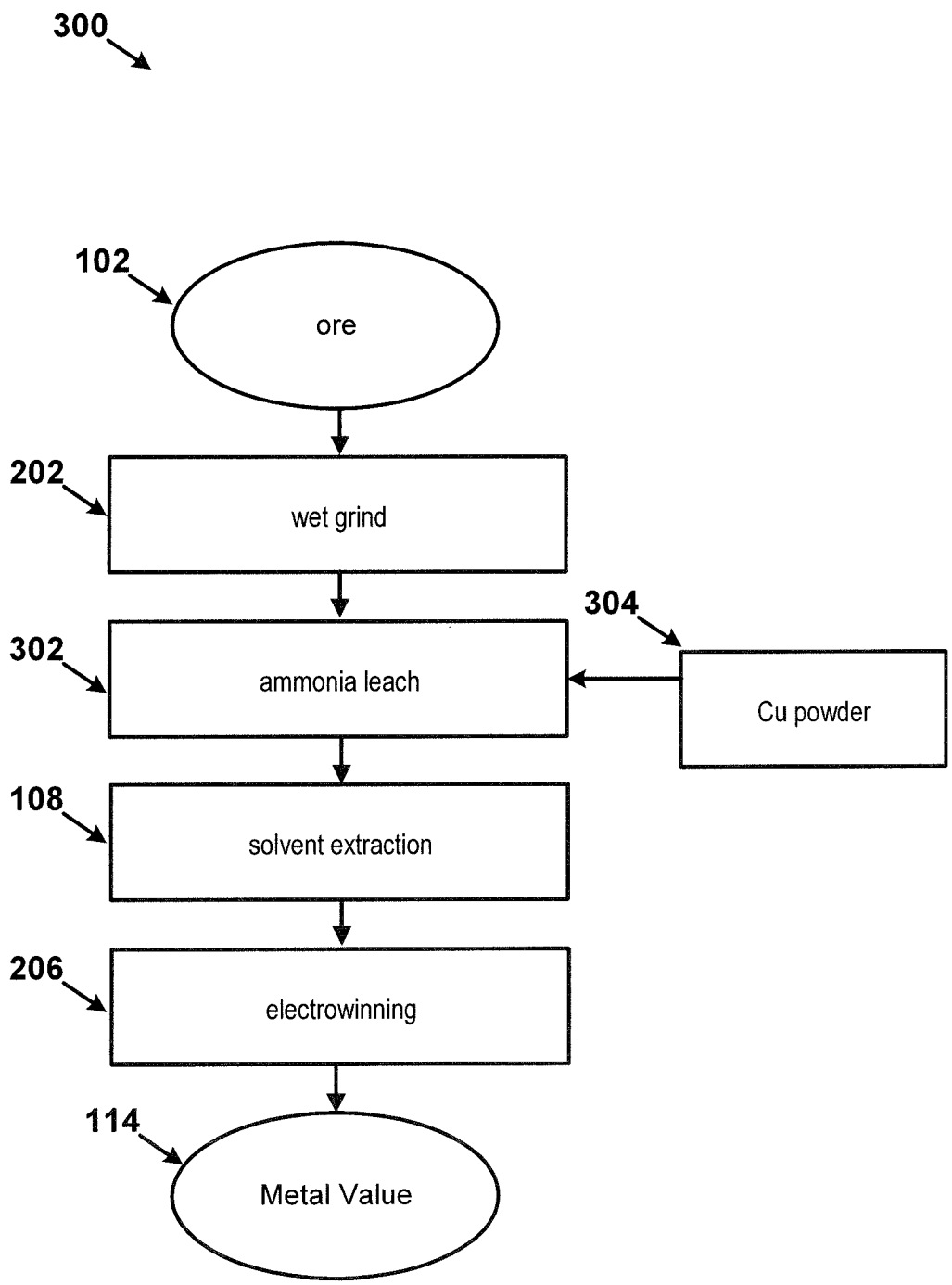
FIG. 3 is a flow diagram illustrating a process having an ammonia leach, in accordance with various embodiments of the present invention.

With reference to FIG. 3, metal recovery process 300 is illustrated. Metal recovery process 300 contains certain steps found in metal recovery process 200.

Ammonia leach 302 receives the wet ground ore from wet grind 202 and subjects the same to leaching in media containing ammonia and/or ammonium.

In accordance with various aspects, ammonia leach 302 comprises an agitated tank leach. Ammonia leach 302 may comprise an agitated tank leach that is performed at constant or varying basic pH levels. Basic pH levels may range from about 7 to about 14. Ammonia leach 302 is performed using basic media containing ammonia. For example, the basic media used in ammonia leach 302 may include an aqueous solution of ammonia. One or more metal values from the reduced metal bearing material may be absorbed into the basic media. Basic media in liquid form that contains metal values may be referred to as a pregnant leach solution.

Leach solutions may contain recycled solutions from upstream processes and recovered lixiviant from various processing steps. Fresh lixiviant may also be added. Leaching may occur in several tanks, either co-currently or counter-currently depending on the leach characteristics and kinetics. Preferably, the duration of leaching in accordance with various aspects of the present invention ranges from about 2 hours to about 8 hours. More preferably, the duration ranges from about 4 hours to about 7 hours.

While not wishing to be bound by theory, it is believed that the use of ammonia may be especially advantageous in leaching operations including sulfide ores, for example copper containing sulfide ores. Air, ammonia, and sulfur dioxide ($SO_2$) may react with sulfide ores to yield ammonium sulfite and sulfides. Ammonium sulfite and/or sulfides may undergo another oxidizing reaction to yield thiosulfate and sulfide. Yet another reaction may occur to yield thionate from thiosulfate. Thiosulfate may be regenerated by the addition of ammonium hydrosulfide.

Copper powder 304 is added to ammonia leach 302 as a reducing agent. Copper powder 304 acts to reduce cobalt III to cobalt II. Unexpectedly, copper powder 304 also improves the kinetics of cobalt recovery, as described herein.

While not wishing to be bound by theory, it is believed that the addition of copper powder reduces cobalt III to cobalt II. Cobalt II is soluble in basic media, such as ammonia, and may enter the basic media solution. Copper powder is an excellent source of copper metal, as it has a large surface area and, when used in connection with or proximity to a copper recovery operation, copper powder may be produced on site, reducing procurement and transportation costs.

More particularly, and again not wishing to be bound by theory, a cuprous-cupric couple may be used to reduce cobalt found in heterogenite ($Co_2O_3$). Copper metal reacts with a cupric complex to form a cuprous complex:

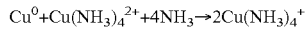
$$Cu^0 + Cu(NH_3)_4^{2+} + 4NH_3 \rightarrow 2Cu(NH_3)_4^+$$

The cuprous complex may then react with the cobalt in heterogenite and the reduced cobalt may become solubilized as an ammonia complex:

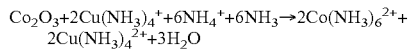
$$Co_2O_3 + 2Cu(NH_3)_4^+ + 6NH_4^+ + 6NH_3 \rightarrow 2Co(NH_3)_6^{2+} + 2Cu(NH_3)_4^{2+} + 3H_2O$$

Combining these two reactions gives an overall reaction:

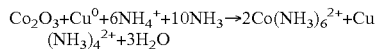
$$Co_2O_3 + Cu^0 + 6NH_4^+ + 10NH_3 \rightarrow 2Co(NH_3)_6^{2+} + Cu(NH_3)_4^{2+} + 3H_2O$$

Based on the overall reaction, one mole of copper powder is required to solubilize two moles of cobalt in heterogenite, giving a stoichiometric Cu/Co molar ratio of 0.5.

However, it has been found that in practice, a greater ratio is advantageous to offset other factors that may be present in the reaction environment. For example, the presence of oxygen may oxidize the cuprous complex to form the cupric complex. Also, the presence of iron in the form of ferric oxides may react similarly to heterogenite, oxidizing the cuprous complex to the cupric complex. Manganese in the form of $MnO_2$ may also oxidize the cuprous complex. These factors, among others, may be mitigated in various embodiments by controlling or limiting the presence of oxygen, iron compounds, and/or manganese compounds, among others.

These factors may be overcome by adding additional copper powder so that the Cu/Co molar ratio is above that suggested by stoichiometry, namely 0.5. For example, a Cu/Co molar ratio of 4 to 12 may be advantageous, as described herein below.

Copper powder 304 may comprise dendritic copper powder, molten sprayed copper powder, and/or other forms of copper powder. Molten sprayed copper powder comprises copper powder produced by spraying molten copper into fine droplets. Dendritic copper powder comprises copper powder produced by an electric refining process such as electrolysis. Dendritic copper powder may have a mean particle size on the order of from about 40 microns to about 150 microns, though dendritic copper powder of other mean particle sizes is also contemplated. Dendritic copper powder may be produced directly from an electrolysis process or may be further ground, milled, or otherwise processed after initial production in an electrolysis process. It has been found that effective use of molten sprayed copper powder is associated with a ratio of about 8 moles of molten sprayed copper powder to 1 mole of cobalt. It has been found that effective use of dendritic copper powder is associated with a ratio of about 1 moles of dendritic copper powder to 1 mole of cobalt.

While not wishing to be bound by theory, it is believed that the larger surface area of dendritic copper powder as compared to molten sprayed copper powder renders dendritic copper powder more chemically active. Stated another way, it is believed that the high surface area of dendritic copper powder allows the dendritic copper powder to have a greater reductive capacity per mole than molten sprayed copper powder.

Moreover, while molten sprayed copper powder is available commercially, dendritic copper powder may be produced from an electrowinning operation. Electrowinning operations typically occur in close proximity to basic leaching processes such as that of the present disclosure, so transportation cost of reagent (the dendritic copper powder) tends to be reduced.

The pregnant leach solution may be present with solids in ammonia leach 302. Together, the pregnant leach solution and solids of ammonia leach 302 may be referred to as a metal bearing slurry.

The slurry from ammonia leach 302 is subject to a solid liquid phase separation as described herein, such a CCD circuit. Liquids from the solid liquid phase separation 112 may be forwarded to solvent extraction 108.

The loaded aqueous stream from solvent extraction 108 may be subject to further processing, such as electrowinning 206, to yield metal value 114.

In electrowinning 206, in accordance with various embodiments, the anode is configured to enable the electrolyte to flow through it. As used herein, the term "flow-through anode" refers to an anode so configured.

Any now known or hereafter devised flow-through anode may be utilized in accordance with various aspects of the present invention. Possible configurations include, but are not limited to, metal wool or fabric, an expanded porous metal structure, metal mesh, multiple metal strips, multiple metal wires or rods, perforated metal sheets, and the like, or combinations thereof. Moreover, suitable anode configurations are not limited to planar configurations, but may include any suitable multiplanar geometric configuration.

While, in various embodiments, anodes may be lead-containing (e.g., Pb—Sn—Ca), preferably, the anode is formed of one of the so-called "valve" metals, including titanium (Ti), tantalum (Ta), zirconium (Zr), or niobium (Nb). The anode may also be formed of other metals, such as nickel, or a metal alloy, intermetallic mixture, or a ceramic or cermet containing one or more valve metals. For example, titanium may be alloyed with nickel (Ni), cobalt (Co), iron (Fe), manganese (Mn), or copper (Cu) to form a suitable anode. Preferably, the anode comprises titanium, because, among other things, titanium is rugged and corrosion-resistant. Titanium anodes, for example, when used in accordance with various aspects of embodiments of the present invention, potentially have useful lives of up to fifteen years or more. Titanium anodes may comprise titanium-clad anodes. Titanium-clad anodes comprise a metal, such as copper, clad in titanium, The anode may also comprise any electrochemically active coating. Exemplary coatings include those that comprise platinum, ruthenium, tantalum, iridium, other Group VIII metals, oxides of the same, and mixtures of the same. Ruthenium oxide, tantalum oxide, and iridium oxide are preferred for use as the electrochemically active coating on titanium anodes when such anodes are employed in connection with various embodiments. In accordance with one embodiment of the invention, the anode is formed of a titanium metal mesh coated with an iridium oxide and/or tantalum oxide-based coating. In such embodiments, the iridium oxide and/or tantalum oxide-based coating may be comprised of multiple layers of iridium oxide and/or tantalum oxide. The multiple layers may comprise iridium oxide and/or tantalum oxide in an amorphous state or a crystalline state. In another embodiment of the invention, the anode is formed of a titanium mesh coated with a rutheium-based oxide coating. Anodes suitable for use in accordance with various embodiments of the invention are available from a variety of suppliers.

In various embodiments, copper electrowinning operations use either a copper starter sheet or a stainless steel or titanium "blank" as the cathode. In accordance with one aspect of an exemplary embodiment, the cathode is configured as a metal sheet. The cathode may be formed of copper, copper alloy, stainless steel, titanium, or another metal or combination of metals and/or other materials. The cathode is typically suspended from the top of the electrochemical cell such that a portion of the cathode is immersed in the electrolyte within the cell and a portion (generally a relatively small portion, less than about twenty percent (20%) of the total surface area of the cathode) remains outside the electrolyte bath. The total surface area of the portion of the cathode that is immersed in the electrolyte during operation of the electrochemical cell is referred to herein, and generally in the literature, as the "active" surface area of the cathode. This is the portion of the cathode onto which copper is plated during electrowinning.

In accordance with various embodiments of the present invention, the cathode may be configured in any manner now known or hereafter devised by the skilled artisan.

In accordance with various embodiments, the copper concentration in the electrolyte for electrowinning is advantageously maintained at a level of from about 20 to about 60 grams of copper per liter of electrolyte. Preferably, the copper concentration is maintained at a level of from about 30 to about 50 g/L, and more preferably, from about 40 to about 45 g/L. However, various aspects of the present invention may be beneficially applied to processes employing copper concentrations above and/or below these levels.

Figure 4:
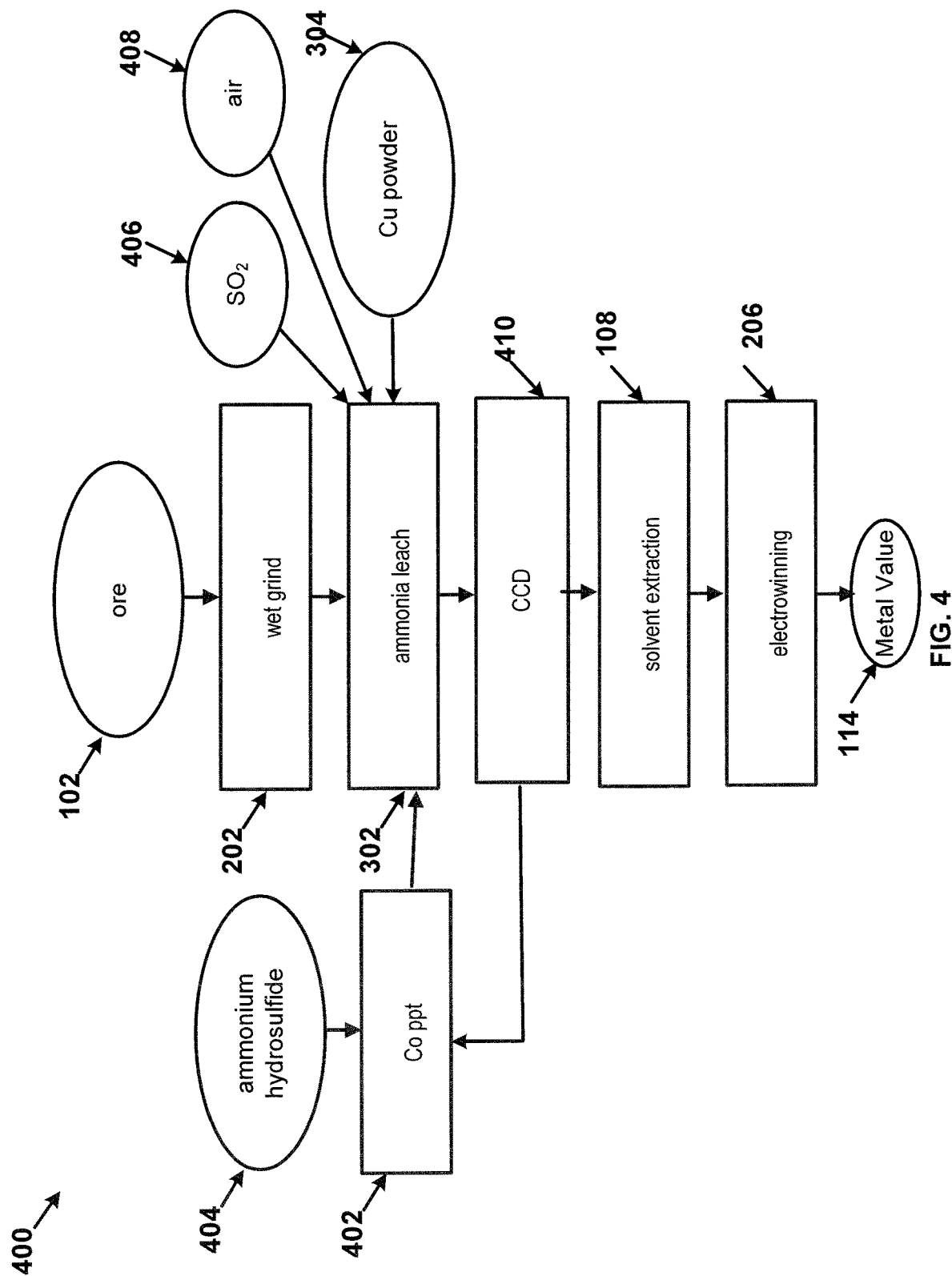
FIG. 4 is a flow diagram illustrating a process having a cobalt precipitation, in accordance with various embodiments of the present invention.

With reference to FIG. 4, metal recovery process 400 is illustrated. Metal recovery process 400 contains certain steps found in metal recovery process 300.

During ammonia leach 302, copper powder 304 is added with sulfur dioxide ($SO_2$) 406 and air 408. Air 408 and $SO_2$ 406 may be added in gaseous form. Air and ($SO_2$) may be added into a leaching vessel at any point of the leaching vessel. For example, air 408 and $SO_2$ 406 may enter the leaching vessel near the bottom of the leaching vessel and allowed to "bubble" to the top. Air 408 and $SO_2$ 406 may also be added near the top of the leaching vessel. Air 408 and $SO_2$ 406 may be added at any suitable partial pressure. Air and $SO_2$ may be added at any point during the kinetically controlled leach reaction. For example, air and $SO_2$ may be added separately at different times. Additions of gaseous reactants may occur within the first hour of the leach cycle, after one or more hours have elapsed, or within the last hour or the leach cycle.

Raffinate from solvent extraction 108 may be sent to cobalt precipitation 402 where ammonium hydrosulfide 404 may be added. While not wishing to be bound by theory, it is believed that ammonium hydrosulfide 404 may act to regenerate thiosulfate, as described above. Ammonium hydrosulfide 404 may also act to precipitate cobalt as cobalt sulfide. In various embodiments, cobalt may be precipitated using an additional precipitating agent. Cobalt containing solids may then be forwarded to further processing for cobalt recovery. The liquid portion of cobalt precipitation 402, which contains ammonia, may be sent to ammonia leach 302.

Countercurrent decantation 410 is shown as a solid liquid phase separation that receives slurry from ammonia leach 302 and separates the slurry into a solid portion and a liquid portion.

EXAMPLE

Figure 5:
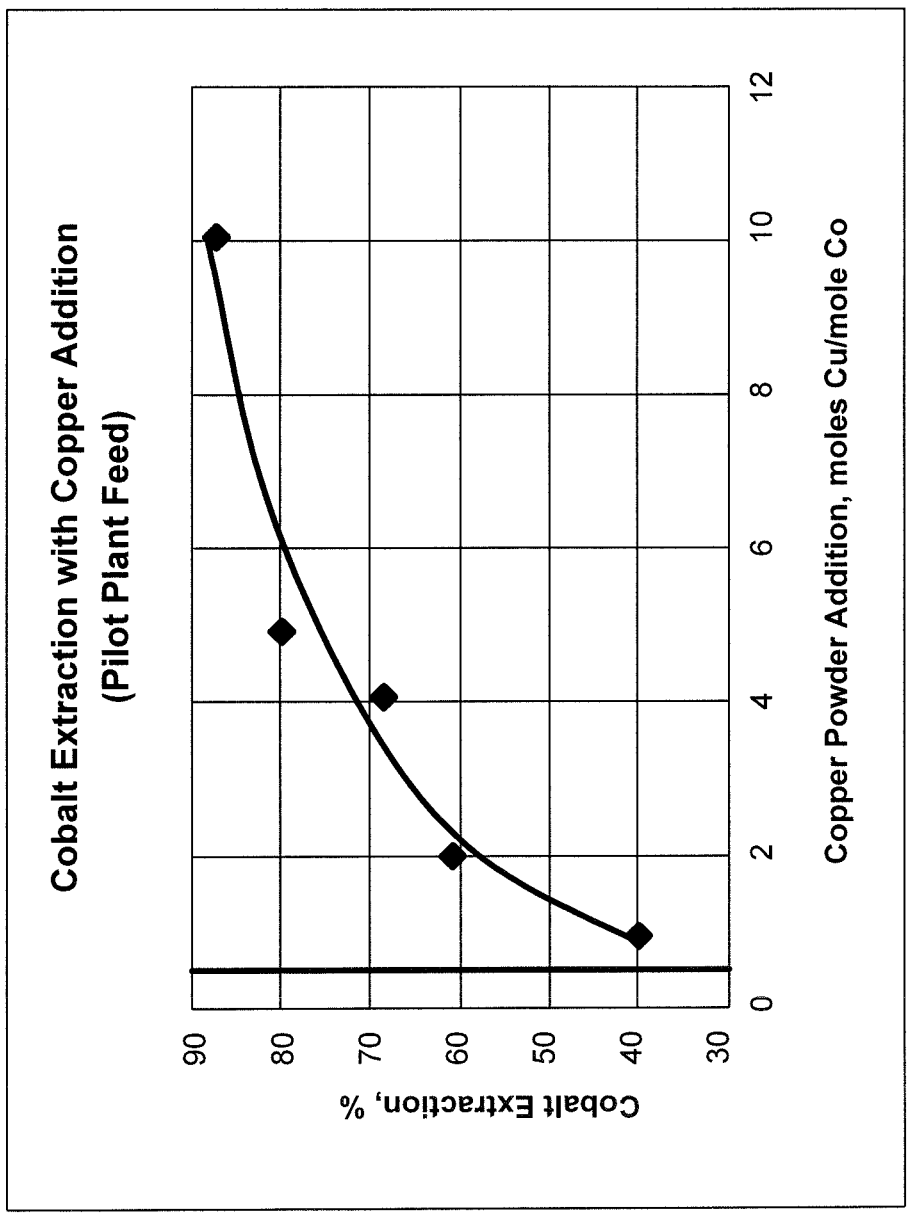
FIG. 5 is a graph illustrating cobalt extraction varying in relation to the ratio of moles of copper powder to moles of cobalt, in accordance with various embodiments of the present invention.

Tests were conducted in accordance with various embodiments disclosed herein. An ammonia leach is performed on an ore containing heterogenite and copper bearing minerals, including copper sulfides. Copper powder is added, which is believed to reduce the cobalt found in heterogenite. Several test processes are run with varying amounts of copper powder added to the ammonia leach. FIG. 5 illustrates the results. Cobalt extraction percentage is shown in the y axis. Copper powder, as expressed as moles of copper powder to moles of cobalt, is shown in the x axis. As predicted by the overall reaction, there is a stoichiometric Cu/Co molar ratio of 0.5. However, as shown in FIG. 5. cobalt extraction percentage is approximately 40% at Cu/Co molar ratio of 0.5. As shown, a Cu/Co molar ratio of approximately 5.5 yields approximately 80% cobalt extraction and a Cu/Co molar ratio of approximately 10 yields approximately 90% cobalt extraction. Thus, the Cu/Co molar ratio may be adjusted in accordance with the desired cobalt extraction rate. Thus, in various embodiments, the Cu/Co molar ratio of approximately 0.5 or greater is used, for example 0.5 to 10, 0.5 to 10, and a 0.5 to 6. From a mass perspective, it has been found that between 2.5 kg of copper powder per ton of ore to 5 kg or greater of copper powder per ton is beneficial.

Figure 6:
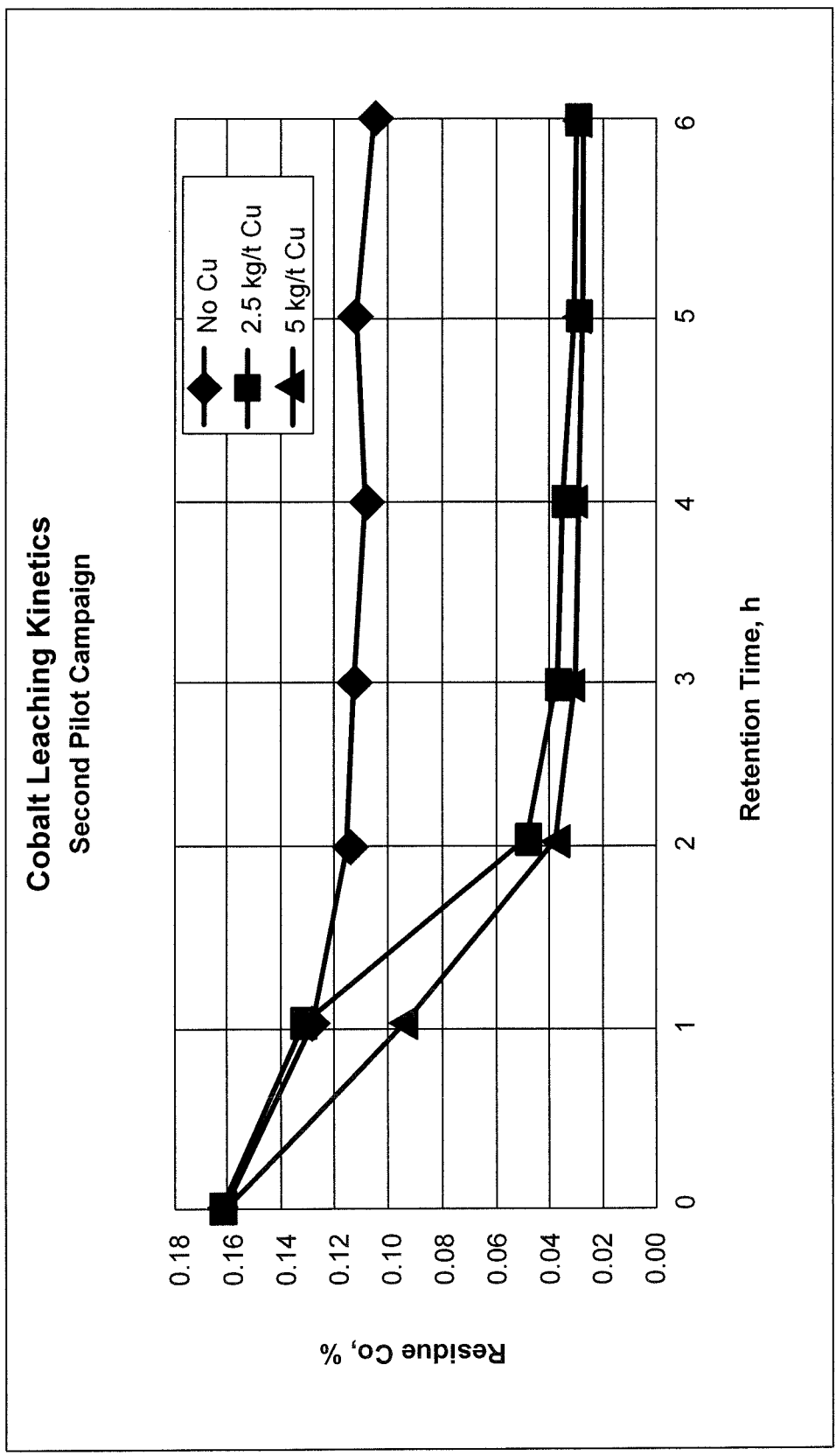
FIG. 6 is a graph illustrating cobalt leaching kinetics in accordance with various embodiments of the present invention.

Unexpectedly, the leaching kinetics of cobalt are found to be enhanced by the addition of copper powder. FIG. 6 shows the results of three tests that involve the use of no copper powder, 2.5 kg of copper powder per ton of ore, and 5 kg of copper powder per ton of ore. The percentage of residue cobalt is given on the y axis and the retention time, in hours, is given on the x axis.

As shown in FIG. 6, after two hours, the percentage of residue cobalt is much lower in the tests involving the addition of copper powder. At 2 hours, the test having no added copper powder had a percentage of residue cobalt of about 0.12%, whereas the tests having a copper powder addition have a percentage of residue cobalt of about 0.04%. Even after 6 hours, the test having no added copper powder does not drop below 0.1% residue cobalt, whereas at six hours, the tests having a copper powder addition have a percentage of residue cobalt of above about 0.02%.

Figure 7:
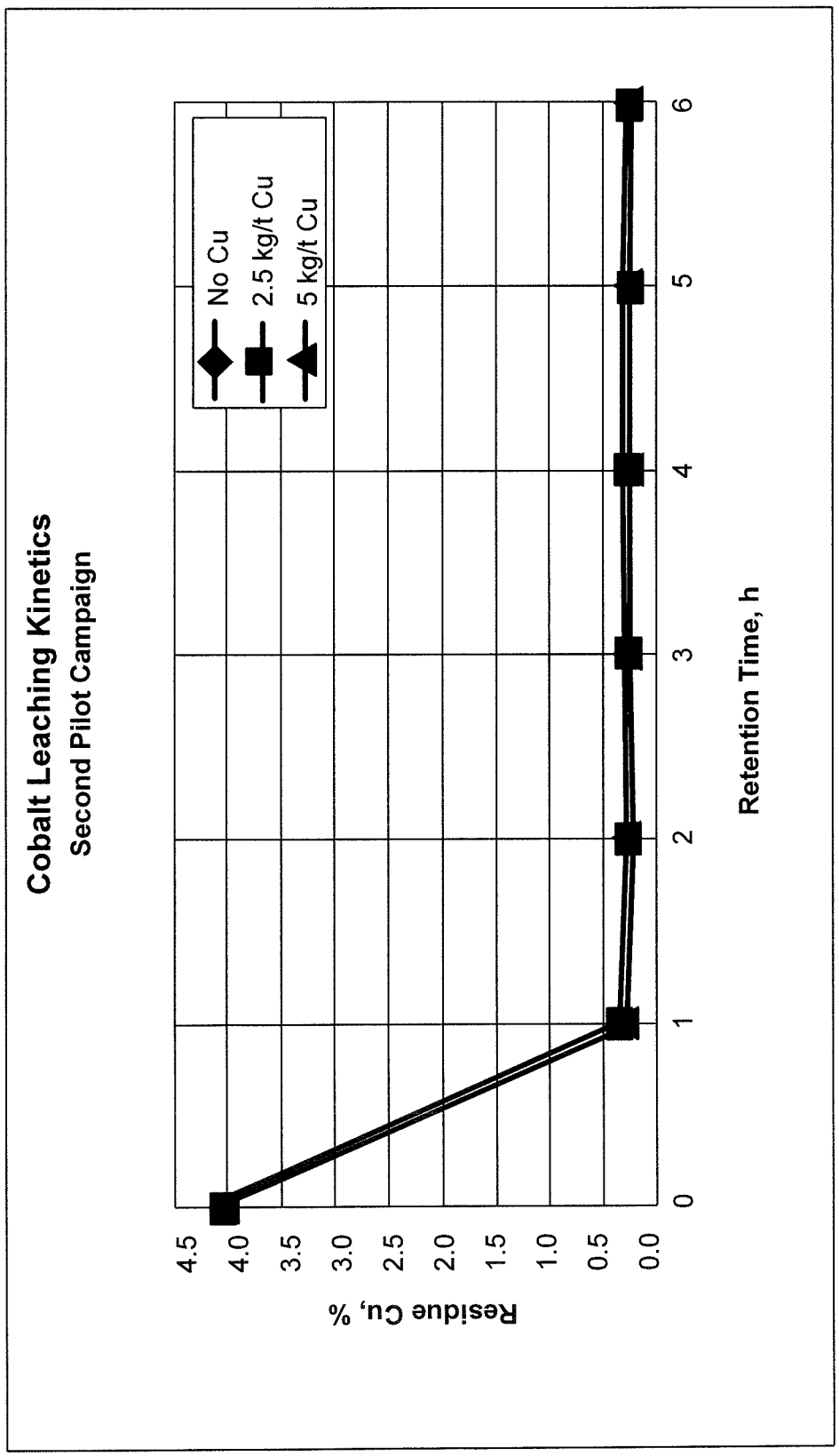
FIG. 7 is a graph illustrating copper leaching kinetics in accordance with various embodiments of the present invention.
Figure 8:
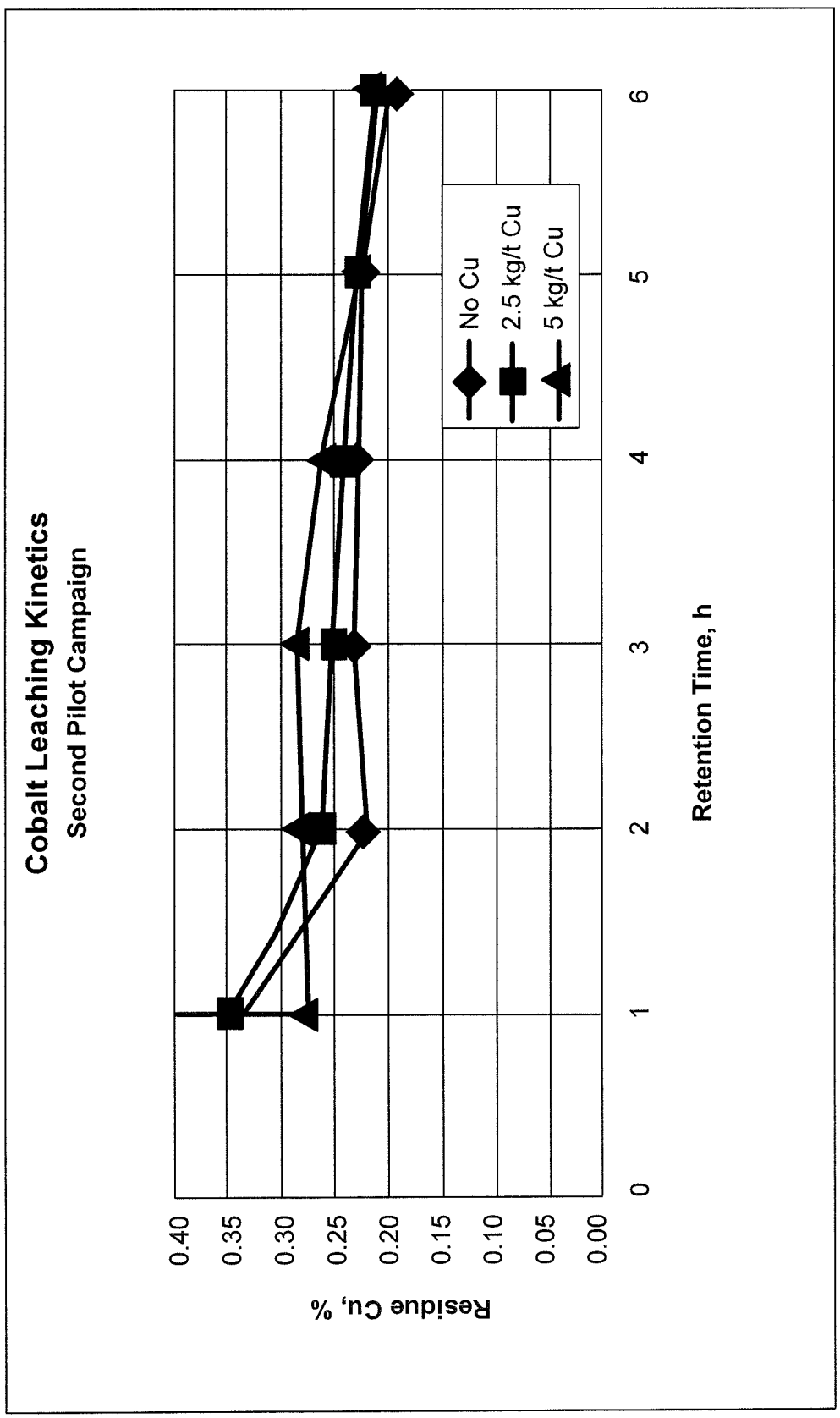
FIG. 8 is the graph of FIG. 7 having an expanded y axis in accordance with various embodiments of the present invention.

The leaching kinetics of copper are found to be relatively undisturbed by the addition of copper powder. FIGS. 7 and 8 show copper leaching kinetics. Percentage of residue copper percentage is displayed on the y axis and retention time on the x axis. FIG. 7 includes a y axis from 0% to 4.5%. As shown, copper leaching kinetics are nearly the same for each test.

In FIG. 8, the y axis is "expanded" into smaller increments to better illustrate the differences between the three tests. In subsequent experimentation, it has been found that the introduction of air may act to oxidize residual copper metal, which may lead to even less variation in copper kinetics.

It is believed that the disclosure set forth above encompasses at least one distinct invention with independent utility. While the invention has been disclosed in the exemplary forms, the specific embodiments thereof as disclosed and illustrated herein are not to be considered in a limiting sense as numerous variations are possible. Equivalent changes, modifications and variations of various embodiments, materials, compositions and methods may be made within the scope of the present invention, with substantially similar results. The subject matter of the inventions includes all novel and non-obvious combinations and subcombinations of the various elements, features, functions and/or properties disclosed herein.

Benefits, other advantages, and solutions to problems have been described herein with regard to specific embodiments. However, the benefits, advantages, solutions to problems, and any element or combination of elements that may cause any benefit, advantage, or solution to occur or become more pronounced are not to be construed as critical, required, or essential features or elements of any or all the claims of the invention. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method comprising:
   leaching a slurry comprising a metal bearing material and an ammonia leach medium, wherein the metal bearing material comprises copper and cobalt;
   adding a reducing agent to the slurry, wherein the reducing agent comprises a dendritic copper powder, and wherein the reducing agent is added to the slurry such that a stoichiometric ratio of copper to cobalt is greater than 0.5; and
   separating the slurry into a pregnant leach solution and solids; and performing a solvent extraction on the pregnant leach solution to produce a loaded aqueous stream.

2. The method of claim 1, wherein the stoichiometric ratio of copper to cobalt is between about 4 and about 12.

3. The method of claim 2, wherein the stoichiometric ratio of copper to cobalt is about 8.

4. The method of claim 1, further comprising: producing a cobalt precipitate from a raffinate produced by the solvent extraction; and subjecting the cobalt precipitate to a metal recovery process.

5. The method of claim 4, further comprising adding ammonium hydrosulfide to the raffinate produced by the solvent extraction.

6. The method of claim 1, subjecting the loaded aqueous stream to electrowinning.

7. The method of claim 1, further comprising wet grinding the metal bearing material prior to the leaching.

8. The method of claim 1, further comprising adding sulfur dioxide gas to the slurry.

9. The method of claim 8, further comprising adding air to the slurry.

10. The method of claim 1, wherein the solvent extraction comprises subjecting the pregnant leach solution to a copper specific extracting reagent.

11. The method of claim 1, wherein the solvent extraction comprises scrubbing an organic phase with a weak acid.

12. The method of claim 11, wherein the weak acid is carbonic acid.

13. The method of claim 12, wherein the carbonic acid is added through dissolving carbon dioxide in water.

14. The method of claim 1, wherein the leaching is performed in an anoxic environment.

* * * * *